United States Patent
Muldowney

(10) Patent No.: US 10,384,578 B2
(45) Date of Patent: Aug. 20, 2019

(54) SEAT ASSEMBLY VISOR

(71) Applicant: Ford Global Technologies, LLC, Dearborn, MI (US)

(72) Inventor: Phillip Kerry Muldowney, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 144 days.

(21) Appl. No.: 15/656,218

(22) Filed: Jul. 21, 2017

(65) Prior Publication Data
US 2019/0023160 A1    Jan. 24, 2019

(51) Int. Cl.
*B60N 2/80* (2018.01)
*B60N 2/879* (2018.01)
*B60R 11/02* (2006.01)
*B60R 11/00* (2006.01)

(52) U.S. Cl.
CPC .......... *B60N 2/879* (2018.02); *B60R 11/0229* (2013.01); *B60R 2011/0017* (2013.01)

(58) Field of Classification Search
CPC . B60N 2/879; B60R 11/0229; B60R 11/0235; B60R 2011/0017; B60R 2011/0003; B60R 2011/0012; B60R 2011/0015
USPC ....................................................... 297/217.3
See application file for complete search history.

(56) References Cited

U.S. PATENT DOCUMENTS

| | | | | |
|---|---|---|---|---|
| 4,702,519 A | * | 10/1987 | Lobanoff | B60N 2/879 297/185 |
| RE33,423 E | * | 11/1990 | Lobanoff | B60N 2/879 297/188.06 |
| 5,640,297 A | * | 6/1997 | Labaze | B64D 11/0015 160/127 |
| 7,805,050 B2 | | 9/2010 | Lavelle et al. | |
| 8,429,694 B2 | | 4/2013 | Chang | |
| 2005/0099042 A1 | * | 5/2005 | Vitito | B60R 11/0211 297/217.3 |
| 2005/0174498 A1 | * | 8/2005 | Wu | B60R 11/0235 348/837 |
| 2005/0206206 A1 | * | 9/2005 | Peng | B60R 11/0235 297/217.3 |
| 2005/0235326 A1 | * | 10/2005 | Vitito | B60K 35/00 725/77 |
| 2009/0261638 A1 | * | 10/2009 | Kuno | A47O 7/38 297/217.3 |
| 2010/0007805 A1 | * | 1/2010 | Vitito | B60K 35/00 348/837 |
| 2012/0268665 A1 | * | 10/2012 | Yetukuri | B60K 35/00 348/837 |
| 2015/0336673 A1 | * | 11/2015 | Hommel | B60R 11/0235 297/217.3 |
| 2015/0367787 A1 | * | 12/2015 | Dueser | B60R 11/0235 297/188.05 |

(Continued)

*Primary Examiner* — Mark R Wendell
(74) *Attorney, Agent, or Firm* — Vichit Chea; Price Heneveld LLP

(57) ABSTRACT

A vehicle seating assembly is provided herein. The vehicle seating assembly includes a seatback coupled to a seat-base. A head restraint is connected to the seatback. A display is disposed within the head restraint. A visor is configured to extend over a top portion of the display. The visor may be movable between a stowed position and a deployed position.

15 Claims, 7 Drawing Sheets

(56) References Cited

U.S. PATENT DOCUMENTS

2016/0263970 A1\* 9/2016 Tamaoki ............... B60J 3/0213
2017/0008434 A1 1/2017 Chang et al.

\* cited by examiner

SEAT ASSEMBLY VISOR

FIELD OF THE DISCLOSURE

The present disclosure generally relates to seating assemblies, and more particularly to seating assemblies employing a visor assembly therein.

BACKGROUND OF THE INVENTION

Vehicle seating assemblies may include a display in a portion thereof. It is therefore desired to incorporate structures within the seating assembly to assist in viewing the display.

SUMMARY OF THE INVENTION

According to one aspect of the present disclosure, a vehicle seating assembly is disclosed. The vehicle seating assembly includes a seatback coupled to a seat-base. A head restraint is connected to the seatback. A display is disposed within the head restraint. A movable visor is configured to extend over a top portion of the display.

According to another aspect of the present disclosure, an electronic device for a vehicle is provided herein. The electronic device includes a display mounted within a panel of said vehicle. A video source is operably coupled with the display. A visor is movable between a stowed position and a deployed position. The visor extends rearwardly of the display in the deployed position.

According to yet another aspect of the present disclosure, a seating assembly for a vehicle is disclosed. The seating assembly for a vehicle includes a seatback coupled to a seat-base. An electronic device is disposed within the seatback. A visor is disposed over a top portion and opposing sides of the electronic device.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
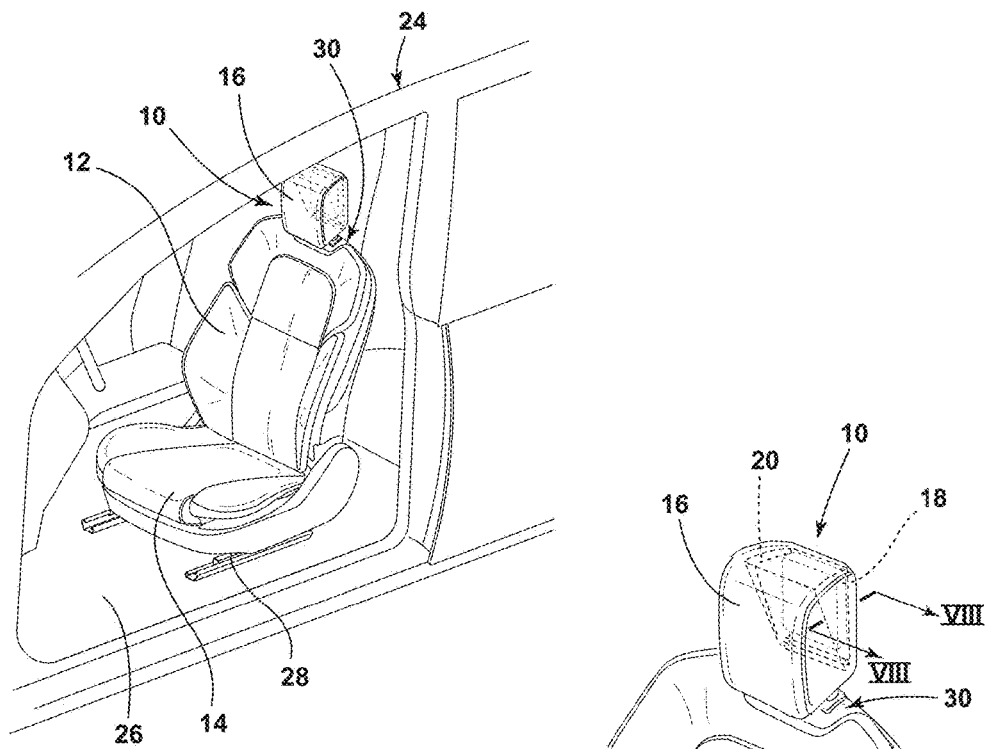
FIG. 1 is a top perspective view of a vehicle seating assembly in a vehicle, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-9, reference numeral 10 generally designates a vehicle seating assembly. The vehicle seating assembly 10 includes a seatback 12 coupled to a seat-base 14. A head restraint 16 is connected to the seatback 12. A display 18 is disposed within the head restraint 16. A visor 20 is configured to extend over a top portion 22 of the display 18. The visor 20 may be movable between a stowed position and a deployed position.

Figure 2:
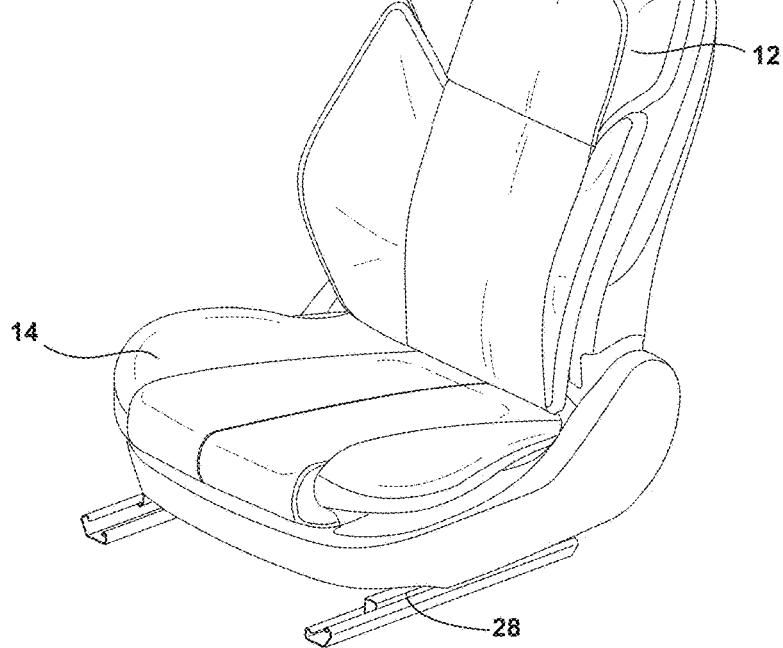
FIG. 2 is a top perspective view of the vehicle seating assembly having a head restraint, according to some examples.

Referring now to FIGS. 1 and 2, the head restraint 16 is shown coupled with the seatback 12 of the vehicle seating assembly 10. The vehicle seating assembly 10 is positioned in a front driver side location of a vehicle 24. It is understood that the vehicle seating assembly 10 may be positioned in various positions throughout the vehicle 24 other than the illustrated position, such as the passenger side location, a mid-row location, and a rear seat location. The vehicle seating assembly 10 includes the seatback 12 that is pivotally coupled to a seat-base 14 to provide reclining functionality to the seating assembly 10. The seat-base 14 is slidably coupled with a floor 26 of the vehicle 24 about a track system 28 to permit forward and rearward linear adjustment of the vehicle seating assembly 10 relative to the floor 26 of the vehicle 24. It is also conceivable that the seat-base 14 may not include the track system 28 and alternatively may be fixedly coupled with the floor 26 of the vehicle 24.

With further reference to FIGS. 1 and 2, the head restraint 16 couples with an upper portion 30 of the vehicle seatback 12 to securely support the head restraint 16 with respect to the vehicle seating assembly 10. The head restraint 16 is oriented on the seatback 12 to extend substantially upright from the upper portion 30 of the seatback 12. As will be provided in more detail below, the display 18 (or an electronic device 32 (FIG. 7)) and/or the visor 20 may be disposed within the head restraint 16. In some examples, the electronic device 32 may be disposed within any panel of the vehicle 24. The visor 20 may be movable between a stowed position and a deployed position in which the visor 20 extends rearwardly of the head restraint 16. It will be appreciated that the visor 20 provided herein may be disposed in any other location within the vehicle 24 without departing from the scope of the present disclosure. For example, the visor 20 may be used in conjunction with a display 18 disposed within an instrument and/or center stack disposed within the vehicle 24.

Figure 3:
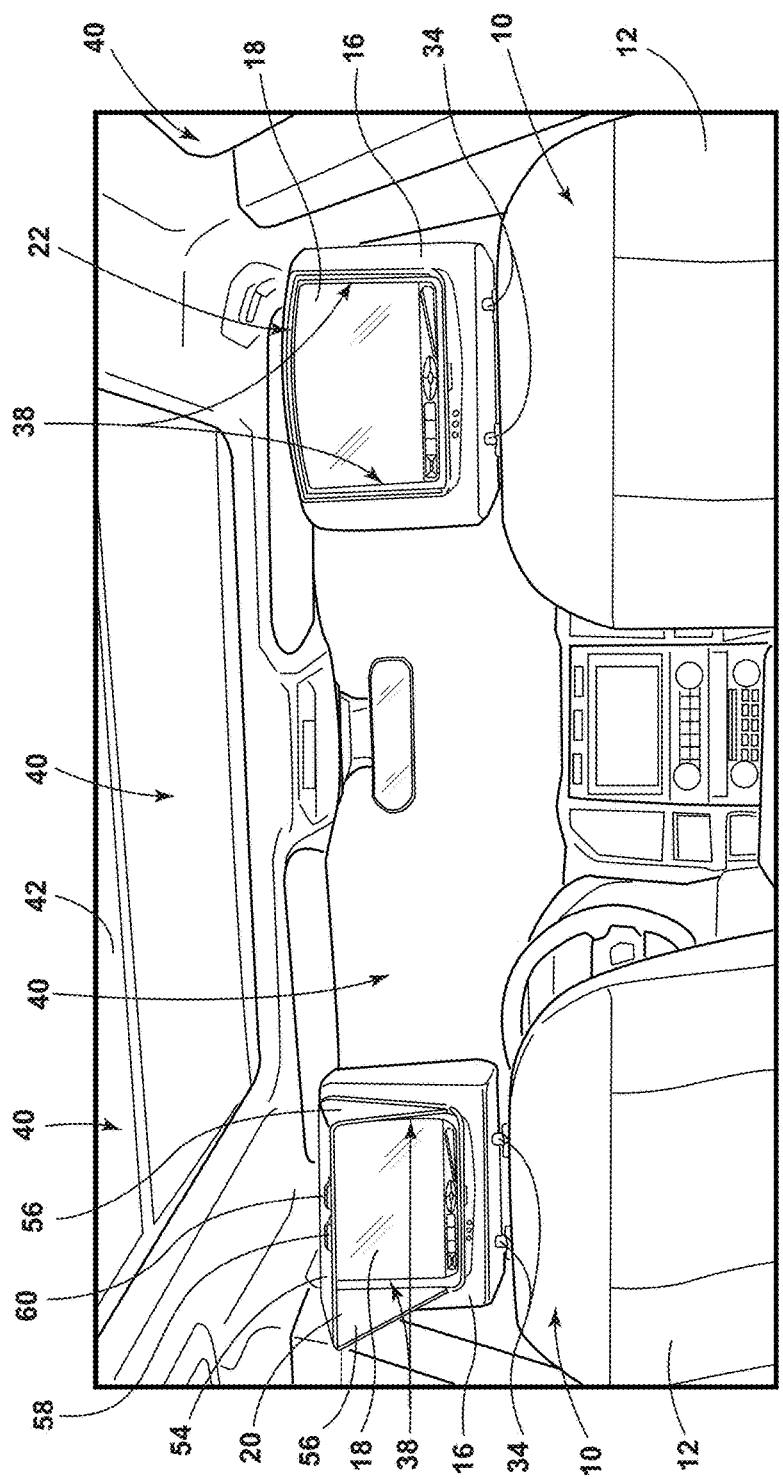
FIG. 3 is a rear perspective view of a pair of vehicle seating assemblies within a vehicle interior having head restraints with a display disposed within each head restraint, according to some examples.
Figure 4:
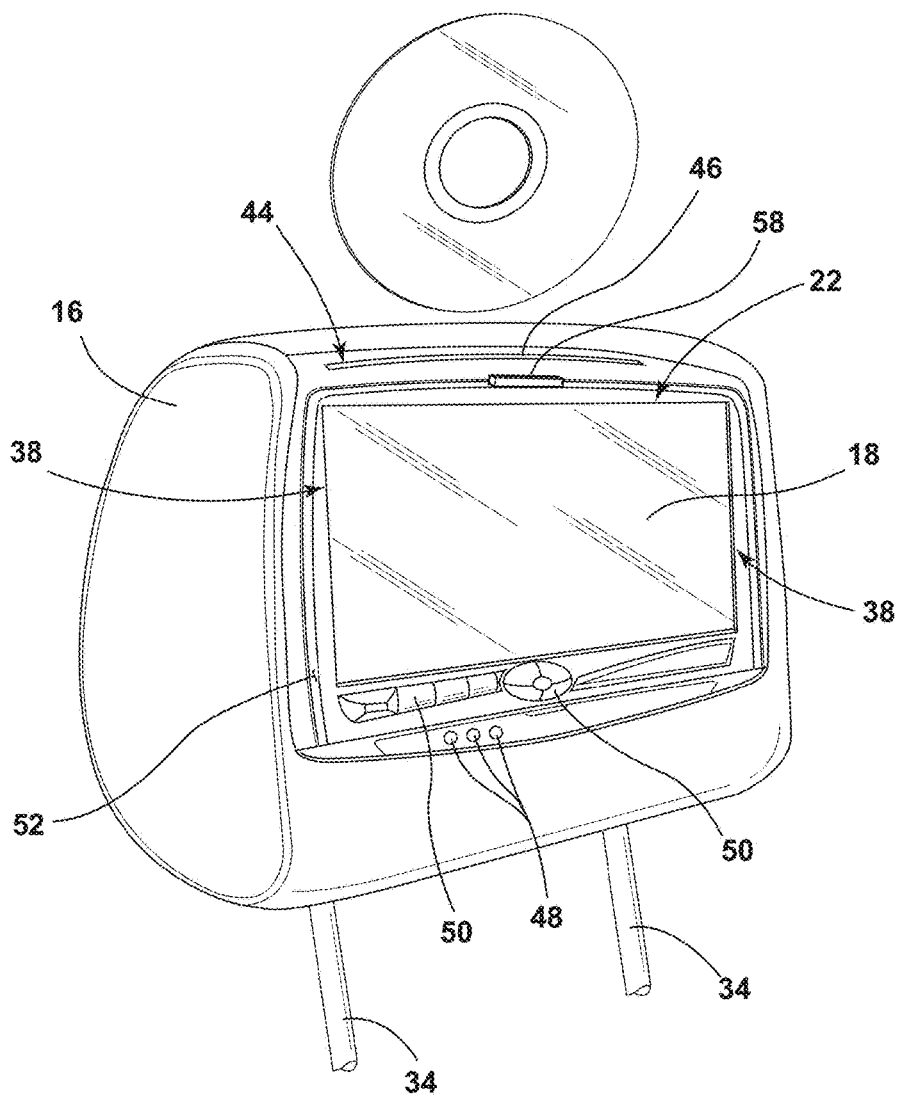
FIG. 4 is a rear perspective view of the head restraint having the electronic device therein, according to some examples.
Figure 6:
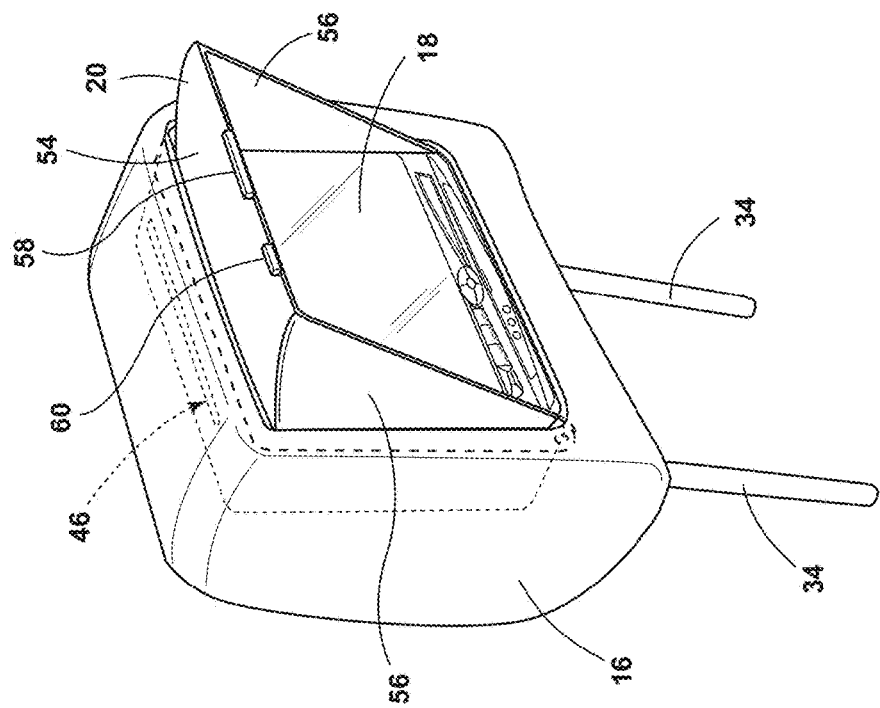
FIG. 6 is a perspective view of the head restraint with the visor in a deployed position, according to some examples.
Figure 5:
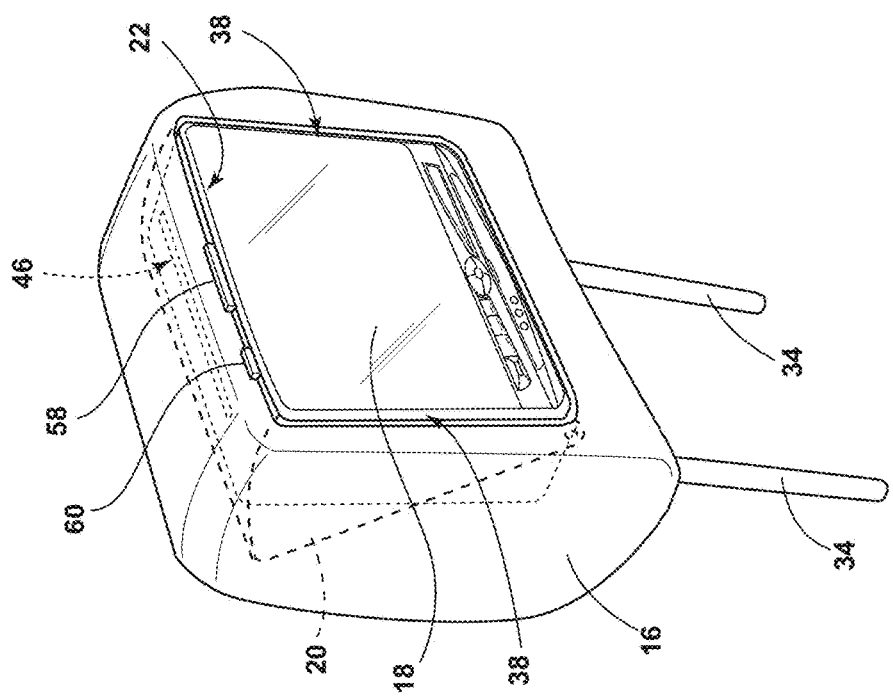
FIG. 5 is a perspective view of the head restraint with a visor in a stowed position, according to some examples.

With reference to FIGS. 3 and 4, a pair of support posts 34 are shown extending down from the head restraint 16 to slidably and removably engage the seatback 12 and thereby provide easier installation of the head restraint 16 onto the seatback 12, such as after assembly/installation of the seatback 12 into the vehicle 24. The slidable installation also allows for the seatback 12 to be fitted with either the head restraint 16 described herein or a traditional head restraint, as generally understood by one having ordinary skill in the art.

Referring still to FIGS. 3 and 4, the electronic device 32 may be coupled to the head restraint 16 or the seatback 12 and include a video source 36 and the display 18. The electronic device 32 may be attached to the head restraint 16 or the seatback 12 in a way that is permanent or allows for removal of the electronic device 32. The visor 20 is disposed around the top portion 22 and/or a side portion 38 of the display 18 and may prevent some light from reflecting off the display 18 causing glare to a viewer of the display 18. The light may be ambient light within the vehicle 24 and/or may enter the vehicle 24 through one or more windows 40 thereof. For example, light may enter the vehicle 24 through a sunroof 42 of the vehicle 24 that may be prevented from reflecting off the display 18 by the visor 20. Moreover, the vehicle 24 may be a convertible, in which ambient light may reflect off the display 18. The visor 20 may enhance the viewing ability of the display 18 by preventing environmental light from reflecting off the display 18. Additionally, the visor 20 may protect the display 18 and/or a video source 36 (FIG. 7) within the head restraint 16 in a stowed position through its placement around the display 18. For example, the visor 20 may prevent rain and/or debris from entering the slot 46 (FIG. 7) and/or any other opening of the electronic device 32.

The electronic device 32 is composed of a series of video and audio components. For example, the electronic device 32 includes the display 18 and the video source 36. The display 18 may display a wide range of entertainment, information, settings, preferences, controls, etc., to an occupant of the vehicle 24. Moreover, the video source 36 may provide functionalities, including, but not limited to, video playback, satellite radio, satellite television, GPS guidance systems, memory cards, wireless internet access (for example, Wi-Fi), Bluetooth, digital video recorders, digital video reception and recording, digital video inputs, video conferencing, cellular digital, cellular digital with a camera, etc.

The display 18 may be configured as a light-emitting diode (LED) display, organic LED (OLED) display, light emitting polymer (LEP) display, polymer LED (PLED) display, liquid crystal display (LCD) display, thin film transistor (TFT) LCD display, LED side-lit or back-lit LCD display, the like, combinations thereof, or any other type of display known in the art. In some embodiments, the display 18 may possess a square or a rectangular aspect ratio, which may be viewed in either a landscape or a portrait orientation. In other embodiments, the display 18 may have a round, circular, or oval shape.

The display 18 is operably coupled to the video source 36, such as a DVD player 44, for the transmission of content thereto. In some examples, the DVD player 44 or other video source is integrated within the head restraint 16. In other examples, the video source 36 may be disposed in any other practical location of the vehicle 24. It will be appreciated that the video source 36 may take a variety of forms without departing from the scope of the present disclosure. For example, the video source 36 may include satellite video systems, Bluetooth wireless based systems, and/or any other video source 36 that may be operably coupled with the display 18.

In some examples in which the video source 36 accepts DVDs, a slot 46 may be disposed along a top portion, or any other portion, of the head restraint 16 for accepting the DVD into the video source 36. While the DVD player 44 is disclosed as being a slot-loaded design with insertion above the display 18, the DVD player 44 could take a variety of other forms while still being integrated with the display 18. As provided herein, the video source 36 may be capable of accepting a DVD when the visor 20 is in the deployed position and blocked by the visor 20 in the stowed position. The electronic device 32 may further include ports 48, which may be configured as any type of input/output. The inclusion of these ports 48 allows for ready attachment of the display 18 to other remote a/v sources (for example, game consoles, portable digital music players, etc.).

Control of the electronic device 32, including the display 18, video source 36, and other components of the video system 12, is facilitated by the provision of control buttons 50 along the outer surface of the video system 12. For example, conventional control buttons 50 may also be provided for control of traditional functions.

With further reference to FIGS. 3-6, the display 18 may be separated from the head restraint 16 by a gap 52. The visor 20 may be disposed within the gap 52. Accordingly, the width of the gap 52 may be larger than the thickness of the visor 20. According to some examples, the shade assembly includes an upper surface 54 that extends over the top portion 22 of the display 18. The visor 20 may also include one or more side surfaces 56 that are disposed outwardly of one or more respective side portions 38 of the display 18. In some examples, the side surfaces 56 may extend orthogonally from the upper surface 54. However, it will be appreciated that the surfaces may be oriented in any manner without departing from the scope of the present disclosure. Moreover, the upper surface 54 of the visor 20 may have a non-linear orientation in some examples.

In some examples, the visor 20 may be formed from a polymeric material, an elastomeric material, combinations thereof, and/or any other practicable material. Moreover, the visor 20 may be formed from a fabric and/or a cover stock 64 material. The fabric may be disposed around a cage to form the desired orientation.

Referring again to FIGS. 5 and 6, the visor 20 may include a handle 58 for assisting an occupant in moving the visor 20 between the stowed and deployed positions. In some examples, the handle 58 may protrude from the visor 20 and may be integrally formed therewith. However, in other examples, the visor 20 may be attached to the visor 20 in any practicable manner without departing from the scope of the present disclosure. In some examples, a release button 60 may be operably coupled with the visor 20 to move the visor 20 to a predefined position once the release button 60 is depressed. For example, the release button 60 may place the visor 20 in the deployed position once depressed. The release button 60 may be operably coupled with any biasing assembly known in the art.

Figure 7:
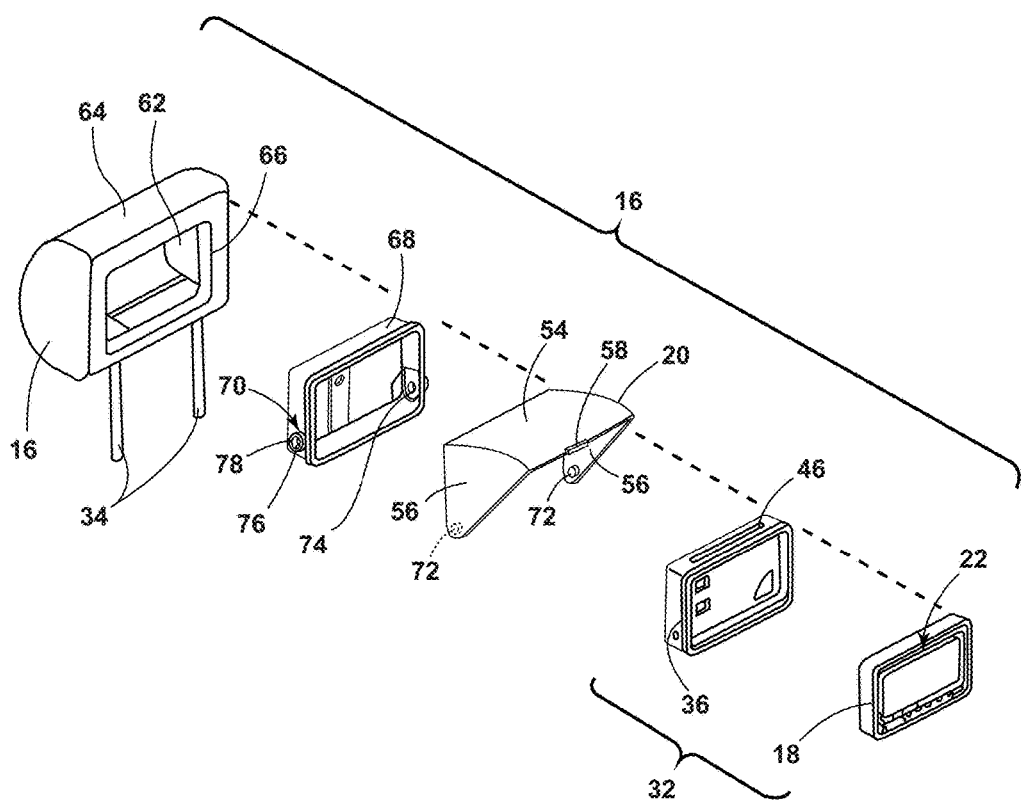
FIG. 7 is a rear exploded view of the head restraint having the visor and electronic device therein, according to some examples.
Figure 9:
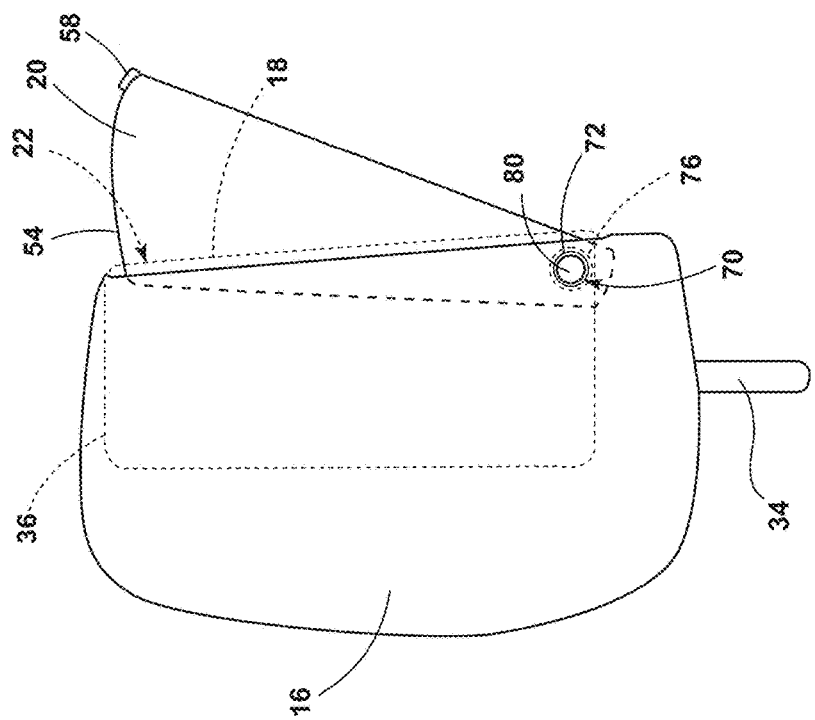
FIG. 9 is a cross-sectional view of the head restraint with the visor in a deployed position taken along the line VIII-VIII of FIG. 2, according to some examples.
Figure 8:
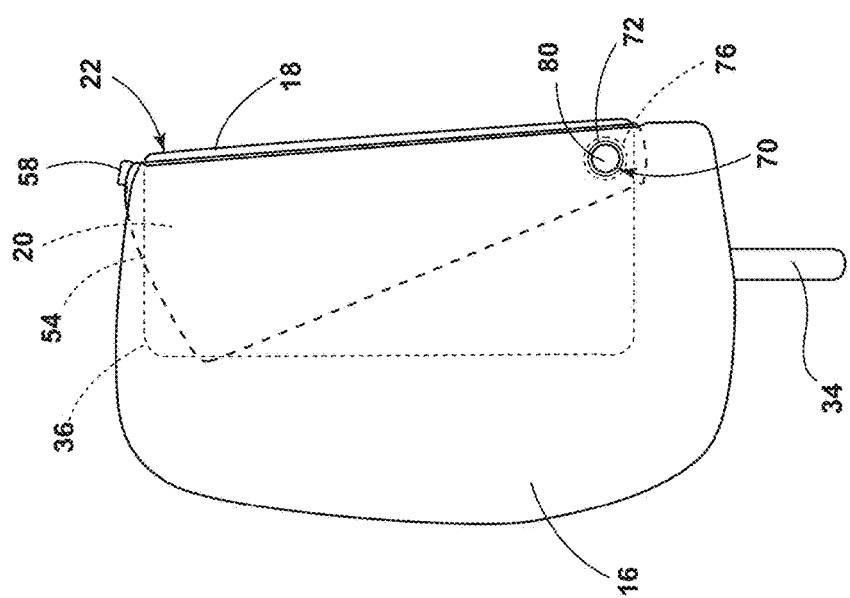
FIG. 8 is a cross-sectional view of the head restraint with the visor in a stowed position taken along the line VIII-VII of FIG. 2, according to some examples.

Referring to FIGS. 7-9, the head restraint 16 includes a cushion 62 and a cover stock 64. The cushion 62 may be formed from a polyurethane foam. However, it is also contemplated that the head restraint 16 may include another type of foam, such as a memory foam, soft foam, or other foam as known to one of ordinary skill in the art. The cover stock 64 is generally disposed over the head restraint 16. Moreover, the cover stock 64 is configured to provide any desired aesthetic look and feel to the head restraint 16. The head restraint 16 further defines an opening 66. A housing 68 is sized and shaped to fit within the opening 66 in the head restraint 16. The housing 68 may be fabricated from a polymeric material, an elastomer material, a combination thereof, and/or any other practicable material. The housing 68 may couple to the video source 36, the display 18, and/or the visor 20.

With further reference to FIGS. 7-9, the visor 20 is coupled to the housing 68 through a head restraint attachment feature 70 and a corresponding visor attachment structure 72. In some examples, the attachment feature 70 is a boss 74 that extends from the housing 68. The boss 74 may include a rim portion 76 and define a void 78. The attachment structure 72 may be a protrusion 80 that is configured to be disposed within the void 78. Accordingly, once the attachment feature 70 and attachment structure 72 interact, the visor 20 may be pivotable about an axis that is parallel to the void 78. In some examples, the axis may be perpendicular to the direction in which the support posts 34 extend (e.g., horizontally in a lateral vehicle side-to-side direction)

Figure 11:
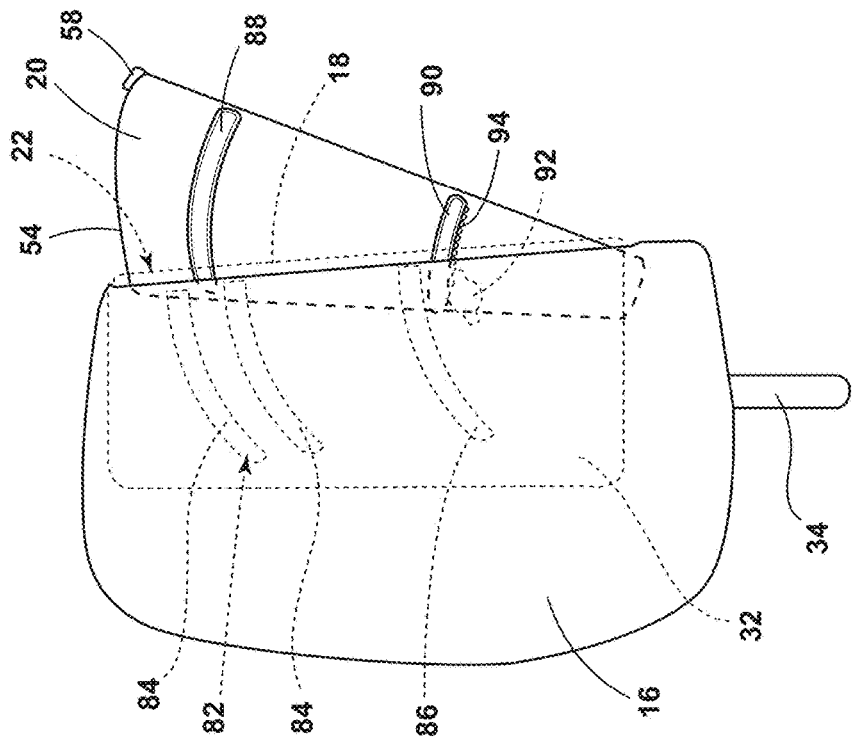
FIG. 11 is a cross-sectional view of the head restraint with the visor operably coupled with the track assembly with the visor in the deployed position taken along the line of FIG. 2, according to some examples.
Figure 10:
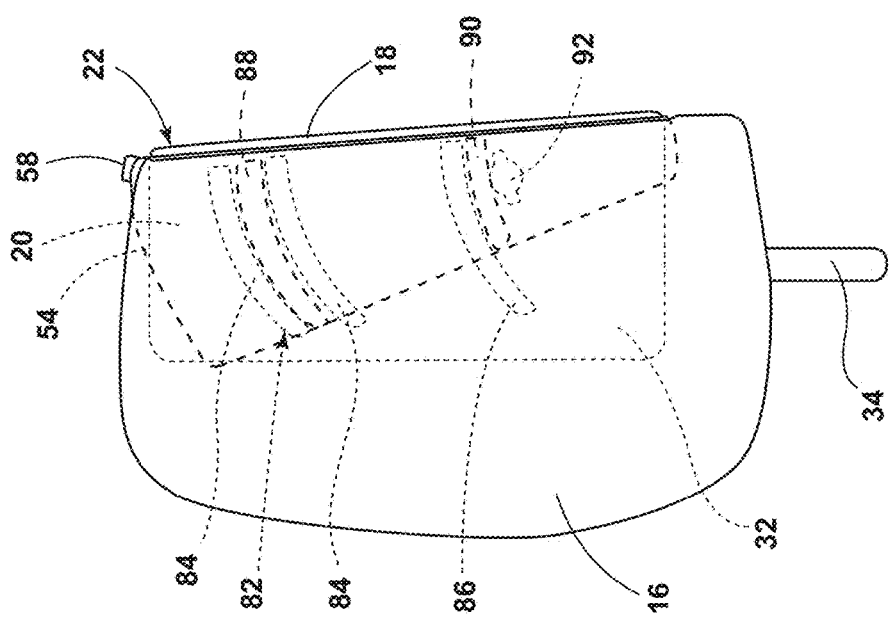
FIG. 10 is a cross-sectional view of the head restraint with the visor operably coupled with a track assembly with the visor in the stowed position taken along the line VIII-VIII of FIG. 2, according to some examples.

Referring to FIGS. 10 and 11, a track assembly 82 may be configured to move the visor 20 between the stowed and deployed positions. In some examples, the track assembly 82 includes an upper rail 84 and a lower rail 86. Correspondingly, upper and lower protrusions 88, 90 on the visor 20 engage the upper and lower rails 84, 86. Accordingly, when the visor 20 is moved between the stowed position and the deployed position, the upper protrusion 88 is guided along the upper rail 84, and the lower protrusion 90 is guided along the lower rail 86 to achieve a smooth opening and closing operation of the visor 20.

The curvature of the upper rail 84 and corresponding upper protrusion 88 may differ from that of the lower rail 86 and corresponding lower protrusion 90. However, the upper protrusion 88 will have a curvature that substantially matches the upper rail 84. Likewise, the lower protrusion 90 will have a curvature that substantially corresponds to the lower rail 86. Additionally, it is contemplated that additional corresponding protrusions 88, 90 and rails 84, 86 can be added to the head restraint 16 and the visor 20. Each of the additional pairs of corresponding protrusions 88, 90 and rails 84, 86 may have a curvature that is different from that of the first two pairs of protrusions 88, 90 and rails 84, 86. In some examples, the track assembly 82 may allow for the visor 20 to have a pivot axis that is rearwardly of the head restraint 16.

With further reference to FIGS. 10 and 11, a damper 92 may secure the visor 20 in the stowed position, the deployed position, and/or an intermediate position. The damper 92 may maintain the visor 20 in a substantially constant position when the visor 20 is deployed, and in some instances, when the visor 20 is deployed rapidly. The damper 92 may be mounted within the head restraint 16 and can be arranged to engage curved rack 94 that can be positioned on the visor 20. The curvature of the rack 94 can be arranged so that the damper 92 can engage the rack 94 as the visor 20 moves between the stowed position and the deployed position. According to some examples, the damper 92 can be a fluid damper. The damper 92 can include a gear that can be connected to a disk contained in a housing containing a viscous fluid. Rotation of the gear can rotate the disk in the viscous fluid so that the damper 92 can slow the movement of the visor 20 to provide a smooth steady opening and closing motion of the visor 20. Those skilled in the art will appreciate that the damper 92 can be other damper arrangements including pneumatic, hydraulic, and mechanical dampers instead of a viscous damper 92 described above. In operation, a user can grasp the handle 58 to move the visor 20 between the stowed and deployed positions. The damper 92 can allow the visor 20 to move smoothly between positions without opening or closing hard. The visor 20 described herein can be provided with a damper 92 to improve a user's experience with the visor 20 and also to help prevent accidental opening of the visor 20 as the first door is moved between open and closed positions.

Use of the present disclosure may offer a variety of advantages. For instance, use of the visor may reduce glare and other viewing issues that may be caused by glare. Moreover, the visor may protect one or more features of the electronic device when the visor is placed in a stowed position. The visor provided herein may be manufactured at low costs while continuing to provide any or all of the features set forth herein.

According to various examples, a vehicle seating assembly is disclosed. The vehicle seating assembly includes a seatback coupled to a seat-base. A head restraint is connected to the seatback. A display is disposed within the head restraint. A movable visor is configured to extend over a top portion of the display. Examples of the vehicle seating assembly can include any one or a combination of the following features:

the visor is also configured to extend along a side portion of the display;

the visor extending over the top portion of the display is fixed;

the visor moves between a stowed position and a deployed position;

a video source disposed within the head restraint and operably coupled with the display, wherein the visor is configured to cover a top portion of the video source in a stowed position;

a handle configured to assist in moving the visor between the stowed position and the deployed position;

a release button configured to assist in moving the visor between the stowed position and the deployed position, wherein the visor is biased in the deployed position;

an attachment feature and an attachment structure, wherein the attachment feature and the attachment structure interact to form a pivot point of the visor relative the head restraint;

a track assembly having a first rail that is disposed within the head restraint and a second rail disposed on the visor, wherein the first rail interacts with the second rail to move the visor between stowed and deployed positions;

an upper surface of the visor has a non-linear orientation; and/or the head restraint is coupled to the seatback through a support post and the visor is pivotable about an axis perpendicular to the direction in which the support post extends.

Moreover, a method of assembling a vehicle seating assembly is provided herein. The method includes coupling a seatback coupled to a seat-base. A head restraint is attached to the seatback. A display is disposed within the head restraint. A visor configured to deploy over a top portion of the display is pivotably coupled to the head restraint.

According to some examples, an electronic device for a vehicle is provided herein. The electronic device includes a display mounted within a panel of said vehicle. A video source is operably coupled with the display. A visor is movable between a stowed position and a deployed position. The visor extends rearwardly of the display in the deployed position. Examples of the electronic device for a vehicle can include any one or a combination of the following features:

the display is disposed within the head restraint;

a track assembly configured to move the visor between a stowed position and a deployed position;

an attachment feature disposed within the head restraint and an attachment structure disposed on the visor, wherein the attachment feature and the attachment structure interact to form a pivot point of the visor relative the head restraint; and/or the attachment feature is configured as a boss defining a void and the attachment structure is configured as a protrusion that is disposed within the void.

According to other examples, a seating assembly for a vehicle is provided herein. The seating assembly for a vehicle includes a seatback coupled to a seat-base. An electronic device is disposed within the seatback. A visor is disposed over a top portion and opposing sides of the electronic device. Examples of the seating assembly for a vehicle can include any one or a combination of the following features:

an outwardly extending handle configured to assist in moving the visor between a stowed position and a deployed position;

a track assembly configured to move the visor between a stowed position and a deployed position;

a boss defining a void disposed within the seatback and a protrusion extending from the visor and disposed within the void; and/or a release button configured to move the visor between a stowed position and a deployed position when the button is depressed, wherein the visor is biased in the deployed position.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
a seatback coupled to a seat-base;
a head restraint connected to the seatback;
a display disposed within the head restraint;
a movable visor configured to pivotally extend over a top portion of the display, wherein the visor pivots between a stowed position and a deployed position; and
a track assembly having a first rail that is disposed within the head restraint and a second rail disposed on the visor, wherein the first rail interacts with the second rail to move the visor between the stowed and deployed positions.

2. The vehicle seating assembly of claim 1, wherein the visor is also configured to extend along a side portion of the display.

3. The vehicle seating assembly of claim 1, wherein the visor extending over the top portion of the display is fixed.

4. The vehicle seating assembly of claim 1, wherein the visor is configured to cover a top portion of a video source operably coupled with the display when disposed in the stowed position.

5. The vehicle seating assembly of claim 1, further comprising:
a handle configured to assist in moving the visor between the stowed position and the deployed position.

6. The vehicle seating assembly of claim 1, further comprising:
a release button configured to assist in moving the visor between the stowed position and the deployed position, wherein the visor is biased in the deployed position.

7. The vehicle seating assembly of claim 1, further comprising:
an attachment feature; and
an attachment structure, wherein the attachment feature and the attachment structure interact to form a pivot point of the visor relative the head restraint.

8. The vehicle seating assembly of claim 1, wherein the head restraint is coupled to the seatback through a support post and the visor is pivotable about an axis perpendicular to the direction in which the support post extends.

9. An electronic device for a vehicle comprising:
a display mounted within a panel of said vehicle;
a video source operably coupled with the display;
a visor movable between a stowed position and a deployed position, wherein the visor extends rearwardly of the display in the deployed position; and
a track assembly configured to move the visor between the stowed position and the deployed position.

10. The seating assembly of claim 9, wherein the display is disposed within a head restraint.

11. The seating assembly of claim 10, further comprising:
an attachment feature disposed within the head restraint; and
an attachment structure disposed on the visor, wherein the attachment feature and the attachment structure interact to form a pivot point of the visor relative the head restraint.

12. The seating assembly of claim 11, wherein the attachment feature is configured as a boss defining a void and the attachment structure is configured as a protrusion that is disposed within the void.

13. A seating assembly for a vehicle comprising:
a seatback coupled to a seat-base;
an electronic device within the seatback;
a visor disposed over a top portion and opposing sides of the electronic device; and
a release button configured to move the visor between a stowed position and a deployed position when the release button is depressed, wherein the visor is biased in the deployed position; and
a track assembly configured to move the visor between a stowed position and a deployed position.

14. The seating assembly for a vehicle of claim 13, further comprising:
an outwardly extending handle configured to assist in moving the visor between a stowed position and a deployed position.

15. The seating assembly for a vehicle of claim 13, further comprising:
a boss defining a void disposed within the seatback; and
a protrusion extending from the visor and disposed within the void.

* * * * *